United States Patent [19]
Schindler

[11] Patent Number: 5,828,495
[45] Date of Patent: Oct. 27, 1998

[54] LENTICULAR IMAGE DISPLAYS WITH EXTENDED DEPTH

[75] Inventor: Roland R. Schindler, Pittsford, N.Y.

[73] Assignee: Eastman Kodak Company, Rochester, N.Y.

[21] Appl. No.: 904,089

[22] Filed: Jul. 31, 1997

[51] Int. Cl.⁶ ............................. G02B 27/10; G02B 27/14
[52] U.S. Cl. ............................................. 359/621; 359/630
[58] Field of Search ..................................... 359/618, 621, 359/629, 630, 619

[56] References Cited

U.S. PATENT DOCUMENTS

| | | | |
|---|---|---|---|
| 2,852,974 | 9/1958 | Nobles | 359/630 |
| 3,732,428 | 5/1973 | Spangler | 250/214 VT |
| 4,093,347 | 6/1978 | La Russa | 359/630 |
| 4,193,666 | 3/1980 | Cojan | 340/971 |
| 4,900,133 | 2/1990 | Berman | 349/11 |
| 5,157,548 | 10/1992 | Monnier et al. | 359/630 |
| 5,508,763 | 4/1996 | Schulte | 353/10 |
| 5,576,886 | 11/1996 | Ferrante | 359/630 |
| 5,596,433 | 1/1997 | Konuma | 359/631 |
| 5,620,245 | 4/1997 | Kobayashi et al. | 353/28 |
| 5,712,732 | 1/1998 | Street | 359/630 |

FOREIGN PATENT DOCUMENTS 0068937  1/1983  European Pat. Off. .

OTHER PUBLICATIONS

*Technology*, "Real–depth imaging rivals 3–D viewing".

Primary Examiner—Georgia Y. Epps
Assistant Examiner—Ricky Mack
Attorney, Agent, or Firm—Gordon M. Stewart

[57] ABSTRACT

A method of forming a virtual integrated lenticular image, and a virtual lenticular imaging apparatus, which allow forming an integrated lenticular image which can exhibit large depth variations between image elements. The apparatus has a beam splitter, and first and second lenticular image elements. Each image element has a lenticular image of interleaved lines from a plurality of images and a lenticular lens sheet or barrier lens sheet aligned with the lenticular image. The lenticular image elements are positioned to project their respective lenticular images onto the beam splitter to provide a virtual integrated lenticular image for viewing.

7 Claims, 7 Drawing Sheets

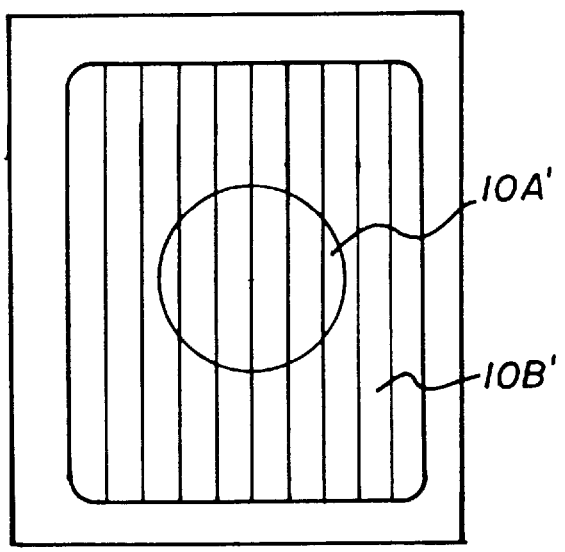
FIG. II

LENTICULAR IMAGE DISPLAYS WITH EXTENDED DEPTH

FIELD OF THE INVENTION

This invention relates to the field of integral imaging, and lenticular imaging in particular.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following United States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others. Use of barrier viewing sheets having alternating opaque and transparent lines, instead of a lenticular lens sheet, is also well known.

Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. No. 3,268,238 and U.S. Pat. No. 3,538,632, can also be used to convey a number of individual two-dimensional scenes (such as unrelated scenes or a sequence of scenes depicting motion) rather than one or more three-dimensional images. Such elements then, when tilted through a range of angles with respect to a viewer's eyes (by moving the element and/or the viewer's eyes), can display different images (whether different perspectives of the same scene) and/or unrelated images, and/or a sequence of images depicting a motion sequence of events. With improvements in technology, the effects obtained can be startling.

Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186.

In a typical method of assembling a lenticular type of integral image element, an original negative is exposed from stored digitized data of a composite lenticular image on a film writer. A suitable film writer is the Symbolic Sciences International Fire 1000 and the LVT Model 1620B, available from Light Valve Technology, a subsidiary of Eastman Kodak Company, Rochester, N.Y. A suitable negative exposure technique is disclosed in U.S. Pat. No. 5,276,478. After photographic processing, the negative is printed, typically by a projection enlarger, onto a suitable film- or paper-based photographic print stock. After processing, the lenticular composite print is coated with adhesive, aligned with a lenticular lens sheet, and pressed against the lens sheet to permanently adhere to it in proper registration with the printed lenticular composite image. However, it is also known to write the lenticular image directly onto a back side of a lenticular lens sheet which is coated with a suitable receiving layer, using a CRT or similar means such as a scanning laser, modulated by the image signal to write the individual interleaved image lines. Furthermore, such "writing" of the lenticular image can be temporary, as in a display produced on a CRT or Liquid Crystal Display ("LCD") screen immediately adjacent the back side.

In forming a lenticular image, the various images from which a lenticular image is formed are decomposed into strips or lines (which may be one or more pixels in width) and these are interleaved and aligned with a corresponding lenticule at its focal point, in a known manner. Such interleaving is, for example, described in U.S. Pat. No. 4,506,296, U.S. Pat. No. 5,278,608, U.S. Pat. No. 5,276,478, U.S. Pat. No. 5,455,689, and U.S. Pat. No. 3,534,164.

One of the problems with lenticular images, is that physical limitations prevent the display of a depth of field beyond certain ranges. For example, in a lenticular image displaying motion, the lenticules are arranged to be oriented horizontally during viewing to provide the clearest motion image. In such case, no depth of field can be provided. Even in three-dimensional lenticular images, the depth of field possible is limited by physical characteristics of the lens sheet itself, such as the desired small pitch (that is, width) of the lenticules so that they are not visible to a user's eye. This in turn limits the possible spacing between image lines to obtain a depth of field, particularly bearing in mind the contrary requirement that the user would like to see as many images as possible. While it is possible in a single three-dimensional lenticular image to obtain an increased depth of field by using two or more original images at a desired spacing wider than that of a person's eyes, this results in image "stutter." That is, the background within the image appears to jump (that is, stutter) substantially relative to the foreground image.

It is also known in conventional CRT display arrangements to use dichroic mirrors and the like to provide an image on a surface (such as a windshield) through which a viewer simultaneously can see real objects. Such "head-up" displays are described, for example in U.S. Pat. No. 4,193,666, U.S. Pat. No. 2,852,974, U.S. Pat. No. 4,900,133, U.S. Pat. No. 5,157,548, U.S. Pat. No. 5,576,886 and others. U.S. Pat. No. 4,093,347 provides a system in which two projected images can appear to a viewer at a single location at different apparent depth, using complex polarizing birefringement displays, including multiple polarizers and quarter wave-length plate.

It would be desirable then, if a system for displaying lenticular images could be provided which could provide the possibility of an enhanced depth of field in the viewed image, even in the case of motion lenticular images, while still maintaining image sharpness for all of the viewed objects in the image.

SUMMARY OF THE INVENTION

The present invention then, provides in one aspect, a virtual lenticular imaging apparatus, comprising:
(a) a beam splitter; and
(b) first and second lenticular image elements each having a lenticular image of interleaved lines from a plurality of images and a lenticular lens sheet or barrier lens sheet aligned with the lenticular image, the lenticular image elements being positioned to project their respective lenticular images onto the beam splitter to provide a virtual integrated lenticular image for viewing.

In a second aspect, the present invention provides a method of displaying a virtual lenticular image, comprising: projecting the image from each of a first and second lenticular image element each having a lenticular image of interleaved lines from a plurality of images and a lenticular lens sheet or barrier lens sheet aligned with the lenticular image, onto a beam splitter to provide a virtual integrated lenticular image for viewing.

The present invention provides a means of obtaining a degree of depth from multiple lenticular images, with high resolution, which cannot practically be obtained from current lenticular images, and without image stutter as described above.

BRIEF DESCRIPTION OF THE DRAWINGS

FIGS. 9 through 11 illustrate different integrated lenticular images as can be observed using an apparatus such as that of FIGS. 5 or 7 with different first and second lenticular image elements.

To facilitate understanding, identical reference numerals have been used, where possible, to designate identical elements that are common to the figures.

DETAILED DESCRIPTION OF THE INVENTION

Figure 1:
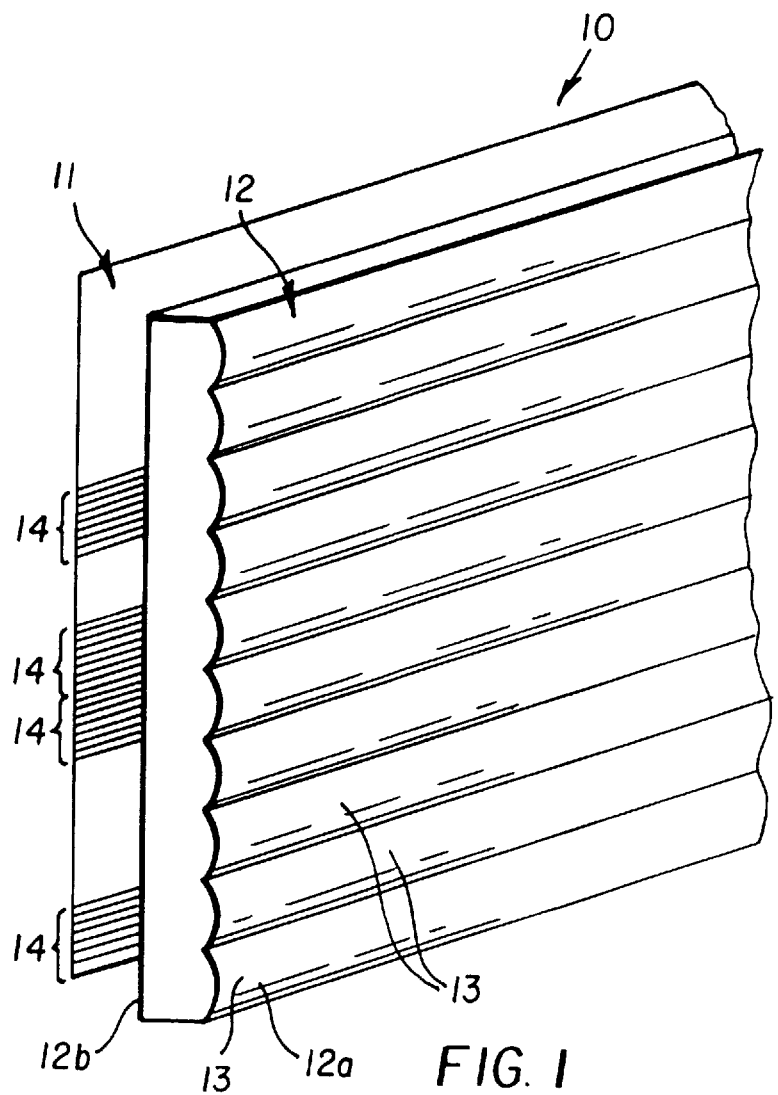
FIG. 1 is a perspective view of a typical lenticular image element.

In the present invention, it will be understood that a "set" of images includes one or more images. The images may be of any type, and include any number or all of the images being images of real world scenes or computer generated images. An "image" when used alone, is used to reference a conventional two-dimensional image such as might be observed by the unaided eye on a conventional photograph or printed page, unless the contrary is indicated. The lenticular lens sheet, rather than having actual curved lens surfaces could have regions of varying indices of refraction through its volume configured in such a way as to provide (in conjunction with the surfaces of the sheet, such as a curved external surface, flat external surface or some other shape) the equivalent optical deflection of light rays as would be provided by a conventional lenticular lens sheet. Also, the back surface of the lens sheet may also be curved so as to either strengthen the lens effect or compensate for the curved focal plane which may be inherent in the lens construction. Consequently, the curvature on the back side may be of such a shape as to match the curvature of the focal plane of the lens.

Further, by a "lenticular" image is referenced an image composed of interleaved lines from at least one complete image (and typically more than one image), which interleaved lines are aligned for viewing with respective individual lenses so that each of the one or more images is viewable when a user's eyes are at the correct angle relative to the imaging element. By a lenticular image "element" is generally referenced a lenticular image in optical alignment with a lenticular lens sheet or barrier sheet. Barrier sheet are known and comprise an opaque barrier with a series of parallel transparent rulings which function to allow one eye of a viewer to see only the interleaved lines of one image at a given angular position with respect to the lenticular image element. It will be understood that reference to viewing a lenticular image, normally refers to it being viewed through a suitable medium such as a lenticular lens sheet or barrier sheet, unless the contrary intention appears.

As to the receiving medium on which the lenticular image is written, this can simply be the back side of the lenticular lens sheet (which in a conventional lenticular lens sheet is a flat side opposite the lenticules). Alternatively, the image receiving medium could be one or more layers coated on the back side of the lens sheet, such as a photosensitive layer or layers (which may in particular be any known photographic layer or layers), or a suitable substrate which is later attached to a lenticular lens sheet or barrier sheet. Additionally, the image receiving medium on the back side of a lens sheet, can be covered with a protective layer either before or after writing the image. In the case of such a protective layer covering before writing the image, the protective layer can be transparent so that writing can be done by a light beam illuminating photosensitive layers on the back side. It will also be appreciated that the apparatus and methods of the present invention can use any combination of lenticular images which exhibit a wide range of effects including motion, depth, flip (that is, apparently unrelated images), and other lenticular related effects without stutter.

In this application, by a perspective sequence of images is referenced a sequence of images (at least two) in lenticular image which are views of a scene taken from different perspectives (that is, from different angular positions) and thereby provide a three-dimensional effect when viewed through a lenticular lens sheet. The resulting lenticular image may be referred to as a three-dimensional lenticular image. If at least three different perspective images are used, this can provide the ability to at least partially look around an object in the scene. A motion sequence is a sequence of images (such as two, three, four or more images) each image of which has at least one (or most, or all) scene element in common but which changes location, shape or size within the scene in a logical manner through the sequence. Motion image sequences for lenticular images are generally two-dimensional images but can be made from a perspective sequence. By a two-dimensional image is referenced an image which, when aligned and viewed through a lenticular lens, does not have any viewable depth element (that is, it does not appear three-dimensional and the viewer cannot look around it at all). By a scene element in this regard, is referenced the same view of the same object (which includes the object appearing to be the same size).

Turning now to the drawings, a typical actual (or real) lenticular image element 10, as seen in FIG. 1, includes a lenticular image 11 containing sets 14 of interleaved lines (only some sets 14 being shown in FIG. 1 for clarity), taken from individual images. Each set 14 contains a line from each image, in a manner well known in the lenticular imaging art. The lenticular image element 10 also includes a lenticular lens sheet 12. Lens sheet 12 includes on a front side 12a, plural adjacent and parallel straight lenticules 13 with their convex lens surfaces. Lens sheet 12 may be made from a suitable flexible plastic and typically has a thickness of about 0.050 inch (1.27 mm). Lenticular image 11 is typically positioned adjacent a back side 12b of lens sheet 12 (although it could be spaced therefrom) with each set of lines 14 aligned with a corresponding lenticule 13. Such alignment does not necessarily require that all lines of a set 14 will be directly beneath a corresponding lenticule 13 (although they often will be), since in some cases such as described in U.S. Pat. No. 5,276,478 and U.S. Pat. No. 5,278,608, some of the lines of a set may in fact be beneath an adjacent lenticule. Hence, the alignment is an optical alignment with image sets being positioned depending upon the intended viewing distance from the lenticular image. Lenticular image 11 when aligned with lens sheet 12, are together sometimes referenced as a lenticular image element 10. As described above, the lenticular image 11 may in fact simply be the interleaved image lines written directly on back side 12b of lenticular lens sheet 12.

To form a lenticular image, the various images (that is, conventional images) from which a lenticular image is to be formed, are decomposed into strips or lines (which may be one or more pixels in width). These image strips or lines from the different images are interleaved and aligned behind a corresponding lenticule at its focal point, in a known manner. Such interleaving is, for example, described in U.S. Pat. No. 4,506,296, U.S. Pat. No. 5,278,608, U.S. Pat. No. 5,276,478, U.S. 5,455,689, and U.S. Pat. No. 3,534,164.

Figure 2:
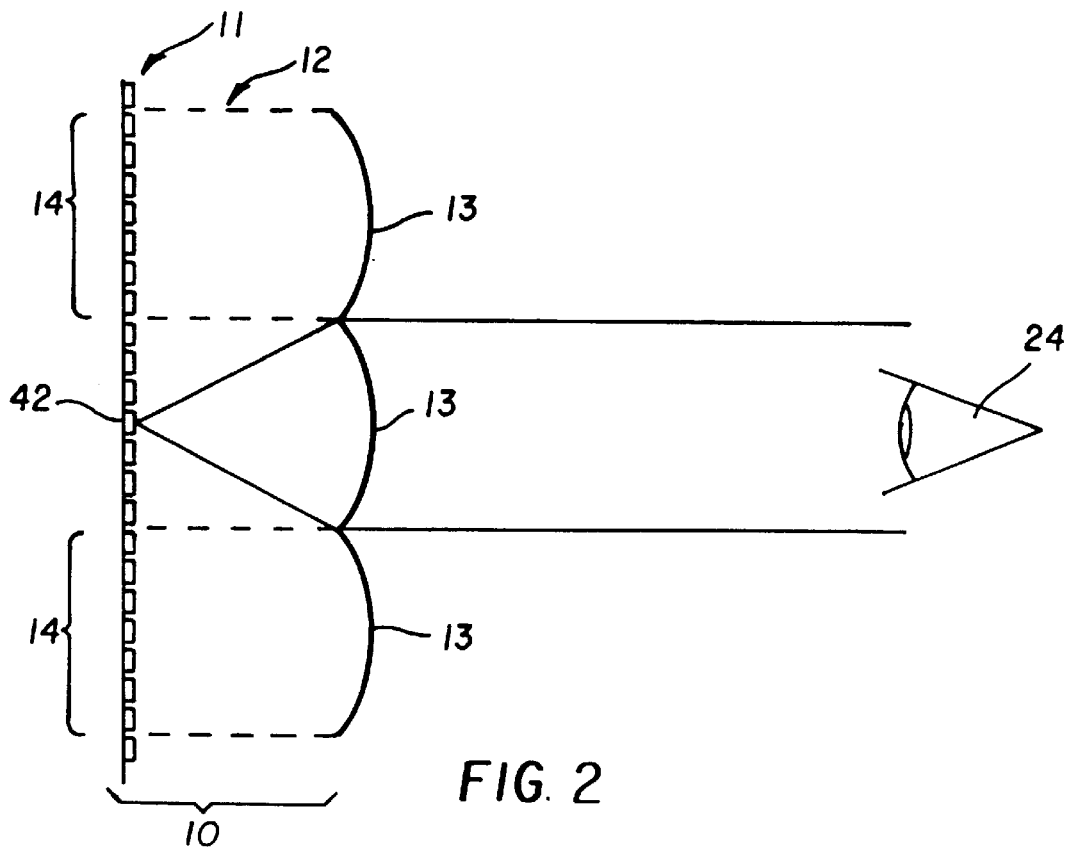
FIGS. 2 and 3 illustrate the operation of a flip or motion lenticular image element which can be used in an apparatus and method of the present invention.
Figure 3:
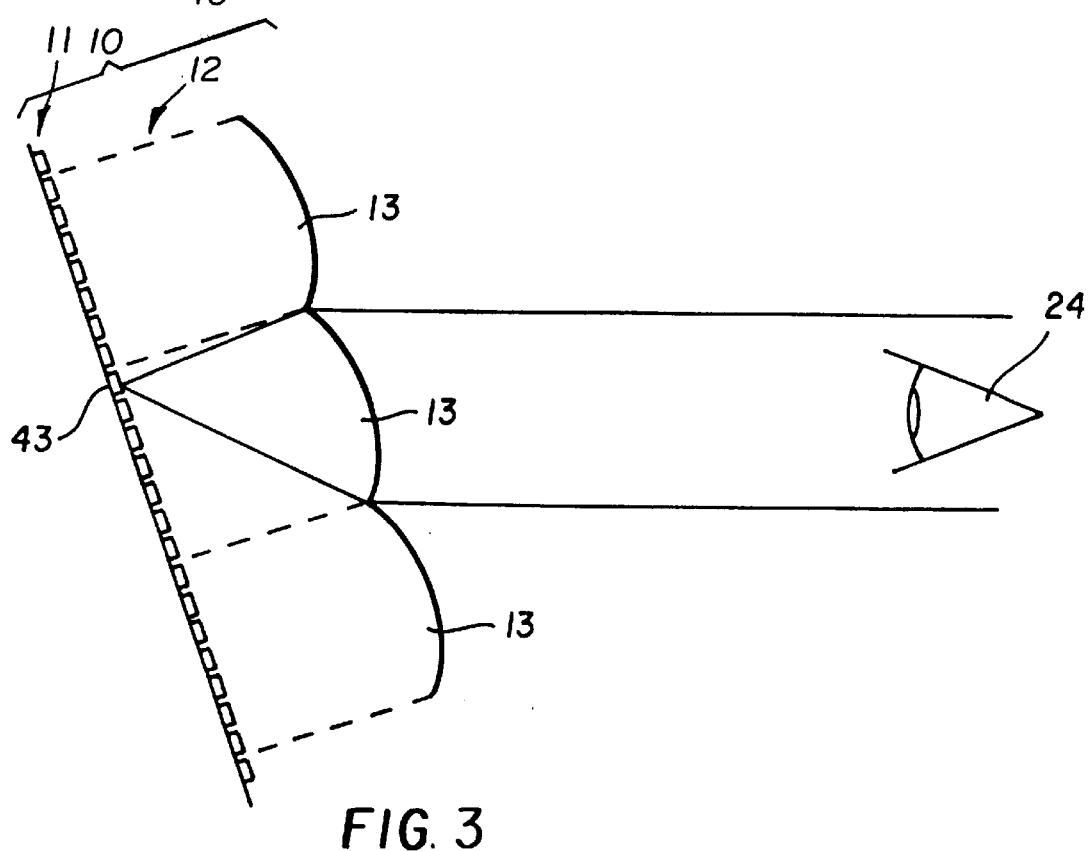

When lenticular image 11 and lens sheet 12 are positioned horizontally as shown in FIG. 1, with the lenticules of sheet 12 parallel to the plane of a viewer's eyes (sometimes referenced as a user or observer). lens sheet 12 allows the observer to see only one of the images at a time. This is illustrated in FIGS. 2 and 3 in which the size of the lenticules 13 and lenticular image 11 have been greatly magnified for clarity (typically the width of lenticules 13 is less than 1 millimeter such the lenticules themselves are not seen by observer 24). As illustrated in FIGS. 2 and 3, altering the angle between observer 24 and the lenticular image element 10 allows observer 24 to see all the images. In particular, as seen in FIG. 2 when an observer 24 is looking through the lenticular array, he or she can see, projected to the infinite, the image line 42. By seeing simultaneously all the lenticules, one can see simultaneously all the image lines of one image and hence can see observe a complete corresponding image. As shown in FIG. 3, as the view angle of the observer 24 relative to the lenticular image 11 is altered, an image line 43 from another image will be seen by the observer behind the lenticule array (and hence the observer sees a different image). In this manner all of the individual images contained in a lenticular image 11 can be seen by observer 24 by changing the relative angle between observer 24 and the image element 10.

Each of the images can, for example, be different still images (to provide a "flip" lenticular image) or motion sequences or any combination of these three. In the case of a motion sequence, the impression of movement is achieved by altering the relative angle between observer 24 and lenticular image element 10 through a range and at such a speed that the sequence of images embedded in it appears to the observer at an appropriate frame rate.

Figure 4:
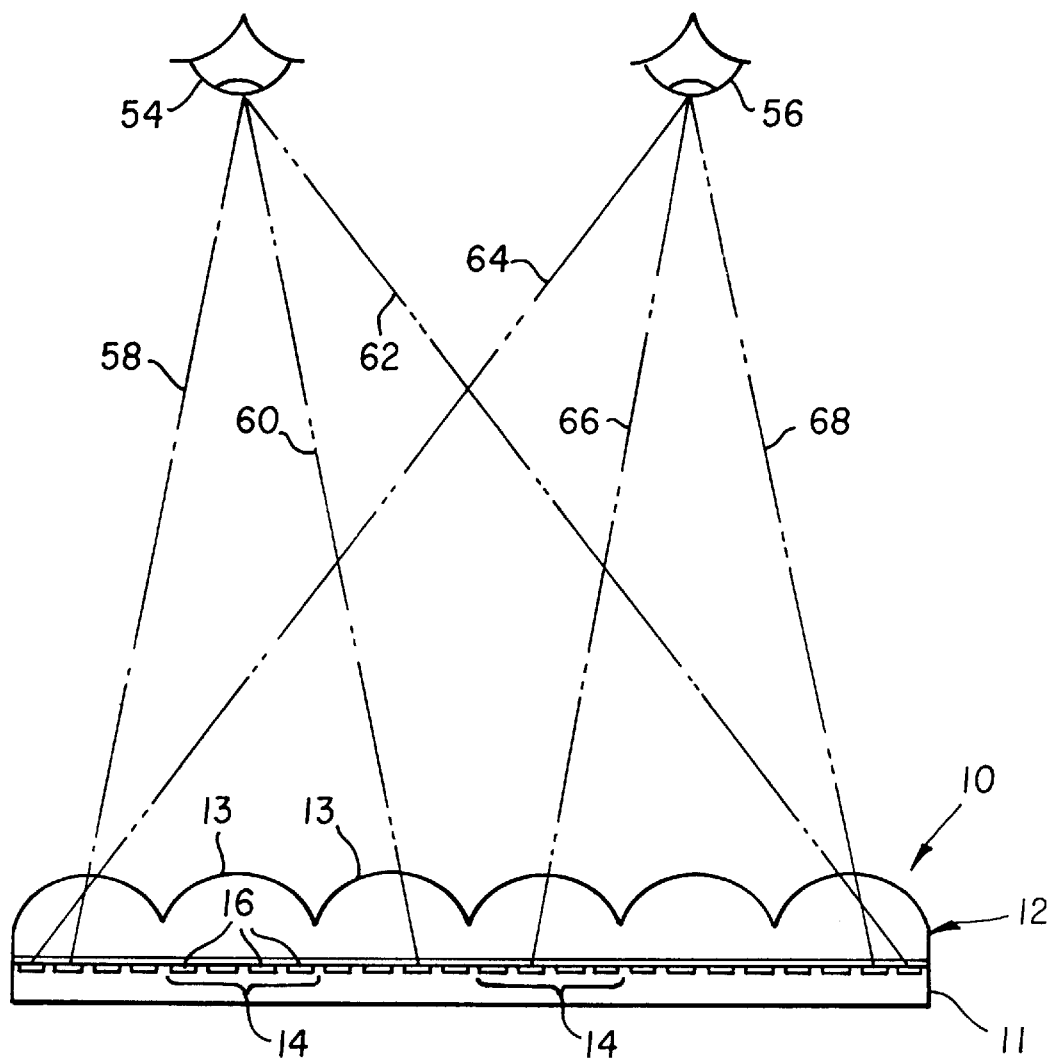
FIG. 4 illustrates the operation of a three-dimensional lenticular image element which can be used in the apparatus and method of the present invention.

Note that if the lenticular image element element of FIG. 1 is rotated 90 degrees from the horizontal position of FIG. 1 so that the lenticules 13 are perpendicular to a viewer's eyes, two images can be seen at the same time. Such an arrangement enables viewing of a three-dimensional lenticular image in a known manner when the interleaved lines are from two or more perspective views of at least one object in a scene. Such a three-dimensional lenticular image element is illustrated in the schematic view of FIG. 4. In this case the lenticular image 11 has an interleaved image suitable for viewing by either transmitted or reflected light. When viewed, one different image line 16 of each set 14 is viewed by each eye 54, 56 of the observer. The image lines viewed by the respective eyes are from different perspective images of the same scene, so that the observed lines merge to create a complete scene with perceived depth of field. The eyes 54, 56 see the image via light rays 58 to 68 through lenticules 13, as a series of simultaneous image lines or view slices. Eye 54 sees image lines via rays 58–62 and combines the lines into a composite, single first view. Simultaneously, eye 56 sees image lines via rays 64–68 and combines the lines into a composite, single second view. The scenes provided by the first and second views provide the depth perspective.

As mentioned above, any type of lenticular image 11 such as those shown in FIGS. 1 through 4, can be used in the virtual imaging apparatus and method of the present invention.

Figure 5:
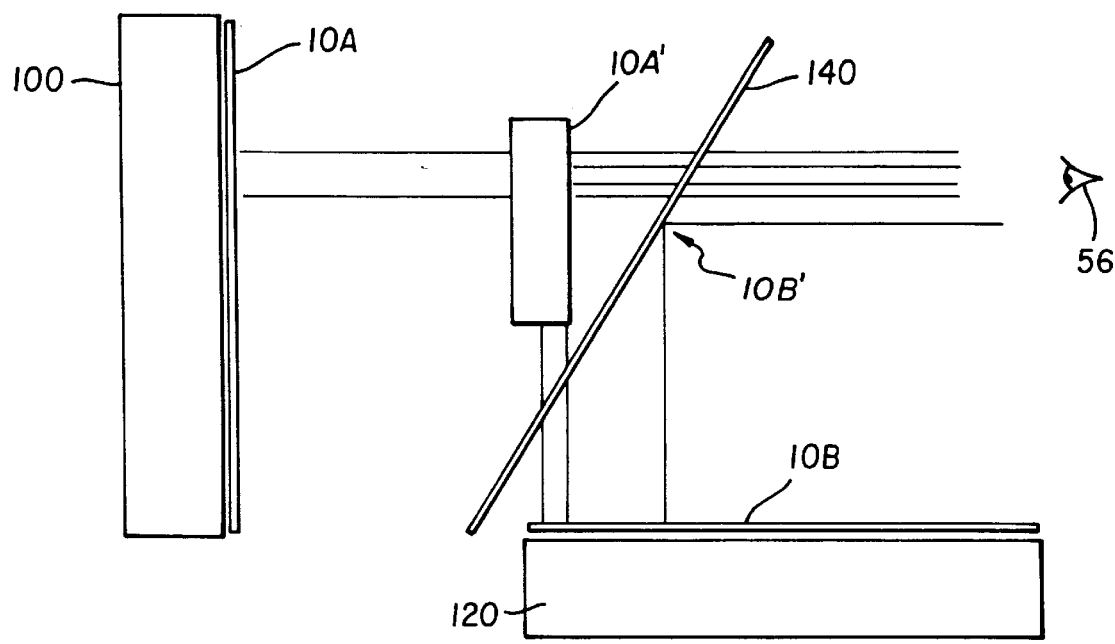
FIG. 5 shows a virtual lenticular imaging apparatus of the present invention.
Figure 6:
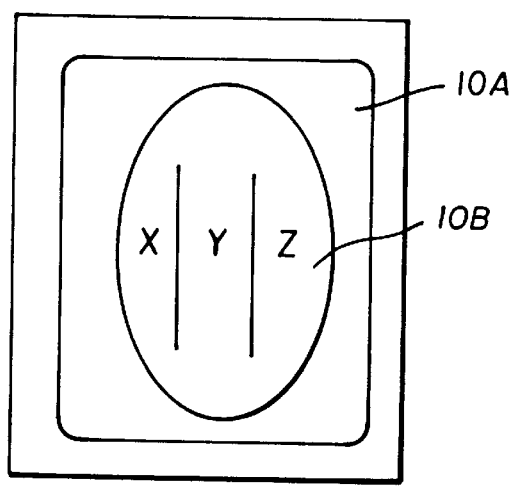
FIG. 6 illustrates the views that might be seen of a virtual integrated lenticular image produced by an apparatus of FIG. 5.

Turning now to FIG. 5, the virtual lenticular imaging apparatus illustrated has two light boxes 100, 120, respective first and second lenticular image elements 10A, 10B, and a beam splitter 140. The corresponding lenticular images of lenticular image elements 10A, 10B then, are caused to be projected by light from their respective light boxes onto a beam splitter 140. As described above, each of the lenticular image elements includes a lenticular image of interleaved lines from a plurality of images and an aligned lenticular lens sheet or barrier lens sheet. This device will give the illusion of depth without the need of any glasses or additional viewing aids. The first interleaved lenticular image 10A is placed at the rear of the viewing device. This image would be one that displays a three-dimensional effect when observed by the viewer whose eyes 54 and 56 receive the light rays from the beam splitter 140 of image 10A. As the lenticular elements 13 are perpendicular to the viewer's eyes, two images can be seen at the same time as shown in FIG. 6. A beam splitter 140 is positioned at a desired angle between the first lenticular image element 10A and second lenticular image element 10B. The beam splitter 140 is of a known partially reflecting/transmitting mirror construction so as to allow an observer with eyes positioned such as eyes 54 and 56 shown in FIG. 5, to see both projected images from lenticular image elements 10A, 10B simultaneously. As the viewer observes from the position of the eyes 54 and 56, they will see the lenticular image of lenticular image element 10B in full 3-D and color, while at the same time viewing the lenticular image of lenticular image element 10A' in a virtual reality space behind the beam splitter 140. The combined image observed is referred to as a virtual integrated lenticular image since it provides for viewing of all the features of the two lenticular image elements 10A, 10B simultaneously. In particular, the three-dimensional lenticular image of three-dimensional image element 10B will be visible with all the usual three-dimensional effects, while virtual image (10A') will appear to float in space in relation to the already three-dimensional image further enhancing the appearance of full 3-D or look around. Additionally, the viewer will also observe the variation in depth between image 10A and image 10B. This latter apparent depth variation can be varied within a large range, it being possible to have such depth variation up to several or more feet (which is not now readily obtained with a single conventional three-dimensional lenticular image).

As mentioned above, the lenticular images in any of the described embodiments may instead be aligned with a barrier sheet rather than a lenticular lens sheet.

FIG. 6 illustrates a virtual integrated lenticular image that would be seen in the apparatus of FIG. 5 where the first lenticular image element 10A is a three-dimensional lenticular image element while the second lenticular image element 10B carries a flip lenticular image with views which flip from (x) to (y) to (z). Depending on the viewer's angular position with respect to beam splitter 140 moving through a range of positions in and out of the page of FIG. 6, the viewer will see the three-dimensional image of image element 10A (with look around effect if provided for in the lenticular image 10A') while seeing the changing images of lenticular image element 10B' suspended in space a considerable distance in front of the three-dimensional image.

Figure 7:
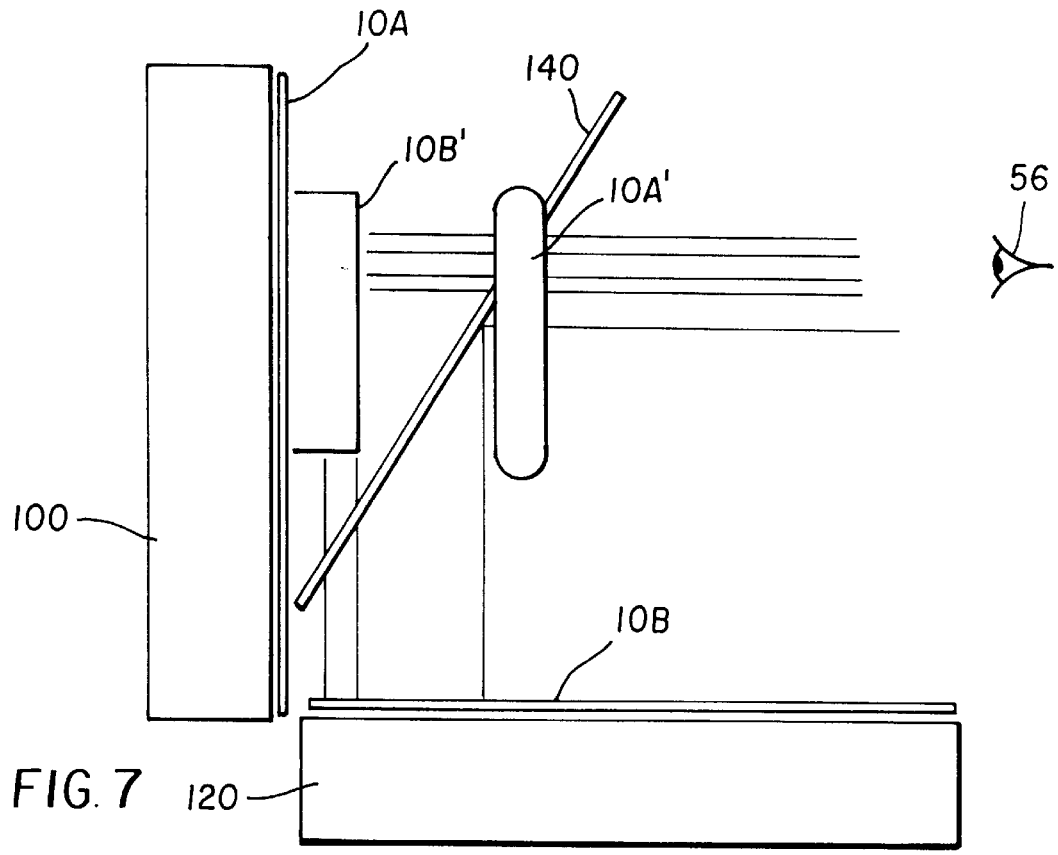
FIG. 7 is a view of an apparatus similar to that of FIG. 5 but arranged to project the lenticular images at different relative depths.

Turning now to FIG. 7 there is shown an apparatus similar to that of FIG. 5 but arranged to project the two lenticular images at different relative depths (Z direction) from that of FIG. 5. In particular, with light box 120 and beam splitter 140 being moved toward one another, the relative depth positions of the two images from the first and second lenticular image elements 10A and 10B is altered. In particular their relative positions are now reversed as viewed by the observer's eyes 54 and 56 (it will be understood in FIGS. 5 and 7 that while only one of observer's eyes 56 is shown, the other eye 54 is in a plane with eye 56 which extends through the paper). Positioning of light boxes 100, 120 with the lenticular interleaved images attached will result in relative depth and or positioning along the Z axis (that is, to the left and right as viewed in FIG. 7 or FIG. 5) of their respective images as seen by observer's eyes 54 and 56. Placing the first lenticular image 10A such that it touches the lower corner of beam splitter 140 and the second lenticular image 10B positioned close to light box 100, as seen in FIG. 7, can result in the first virtual lenticular image 10A' appearing to the observer's eyes 54 and 56 to be in front of the second virtual lenticular image 10B'.

Figure 8:
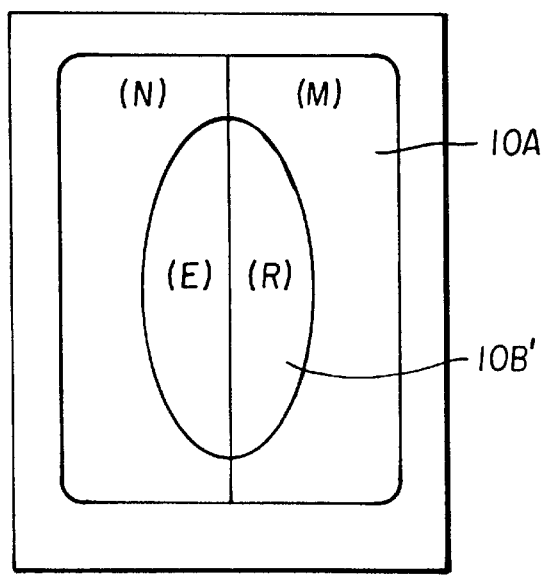
FIG. 8 is similar to FIG. 6 but using different lenticular images in the apparatus of FIGS. 5 or 7.

Referring to FIG. 8, in the illustrated view of an integrated lenticular image as formed by the apparatus of FIGS. 5 or 7, as a viewer moves horizontally left to right (which is in and out of the page as viewed in FIGS. 5 or 7), the rear first lenticular image 10A' will appear to flip from one subject (N) to a second subject (M), and the second lenticular virtual image 10B' will appear to flip to subjects (E) and subject (R).

Figure 9:
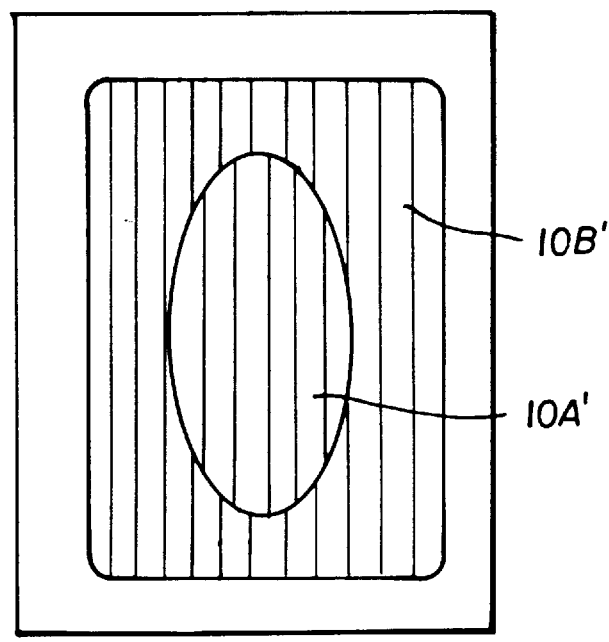

FIG. 9 illustrates another virtual integrated lenticular image as it would appear to an observer's eyes, using the apparatus of FIGS. 5 or 7. In particular, in this arrangement both the first and second lenticular image elements 10A and 10B are three-dimensional image elements. The integrated lenticular image appearing to viewer then, is of the first lenticular interleaved or barrier image 10A' having a look-around or 3-D appearance, and the virtual second lenticular interleaved image 10B' having a 3-D or look-around effect in a position which may be spaced in the Z direction relative to the image from image element 10A'.

Figure 10:
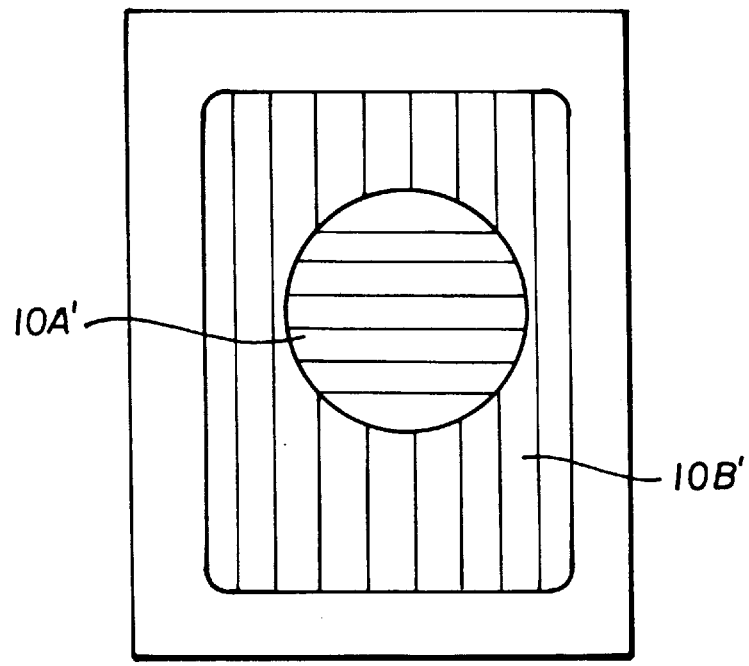

In an alternative arrangement shown in FIG. 10, the first lenticular image 10A' is a three-dimensional lenticular or barrier interleaved image, and an animation/motion interleaved lenticular image is provided for the second lenticular image 10B'. This arrangement produces an integrated virtual lenticular image of a three-dimensional image 10B and a lenticular animation or motion image 10B' appearing to float in virtual space, with a desired depth spacing (along the Z axis) between them.

Referring to the arrangement of FIG. 10, a second lenticular image 10B' is that of a three-dimensional image while lenticular image 10A' is an animated or motion lenticular interleaved image. The integrated virtual lenticular image observed in FIG. 7 is that of motion from the first lenticular image 10A simultaneously with when the viewer moves their eyes 54, 56 to look-around the first virtual lenticular three-dimensional image 10B. Second image 10A, a lenticular interleaved image, is positioned in the light box 120 of the apparatus of FIGS. 5 or 7 with the direction of its lenticules 13 rotated 90 degrees with respect to lenticules 13 of lenticular image element 10A.

FIG. 11 illustrates an arrangement in which the virtual integrated lenticular image provides the effect of three-dimensional viewing from any perspective of a viewer's eyes. This is accomplished by the positioning of a three-dimensional first lenticular interleaved image 10A' such that it falls directly on top of a virtual second lenticular three-dimensional image 10B'.

The invention has been described in detail with particular reference to certain preferred embodiments thereof, but it will be understood that variations and modifications can be effected within the spirit and scope of the invention.

PARTS LIST 10 lenticular image element
10A first lenticular image element
10B second lenticular image element
10A' first virtual lenticular image
10B' second virtual lenticular image
11 lenticular image
12 lens sheet
12a front side
12b back side
13 straight lenticules
14 set of lines
16 image line
24 observer
42 image line
43 image line
54, 56 observer's eyes
58, 60, 62, 64, 66, 68 light rays
100, 120 light boxes
140 beam splitter

What is claimed is:

1. A virtual lenticular imaging apparatus, comprising:
   (a) a beam splitter; and
   (b) first and second lenticular image elements each having a lenticular image of interleaved lines from a plurality of images and a lenticular lens sheet or barrier lens sheet aligned with the lenticular image, the lenticular image elements being positioned to project their respective lenticular images onto the beam splitter to provide a virtual integrated lenticular image for viewing and wherein the first lenticular image element has a lenticular three-dimensional image which includes interleaved lines from a plurality of different perspective views of the same scene, so that the virtual integrated lenticular image includes a three-dimensional image from the first lenticular image element plus another image from the second lenticular image element.

2. A virtual lenticular imaging apparatus according to claim 1 wherein the second lenticular image element has a lenticular flip image which includes interleaved lines from a plurality of different scenes, so that the virtual integrated lenticular image includes a flip image from the second lenticular image element plus another image from the first lenticular image element.

3. A virtual lenticular imaging apparatus according to claim 1 wherein the first and second lenticular image elements have respective lenticular three-dimensional images each of which includes interleaved lines from a plurality of different perspective views of the same scene, so that the virtual integrated lenticular image includes different three-dimensional images from the first and second lenticular images.

4. A virtual lenticular imaging apparatus according to claim 1 wherein the second lenticular image element has a lenticular motion image which includes interleaved lines from a plurality of scenes with at least one scene element in motion, so that the virtual integrated lenticular image includes a three-dimensional image from the first lenticular image element plus a motion image from the second lenticular image element.

5. A virtual lenticular imaging apparatus according to claim 4 wherein the first and second lenticular image elements are oriented such that motion in the motion image from the second lenticular image element is observed when a viewer moves in a direction to look around the three-dimensional image from the first lenticular image element.

6. A virtual lenticular imaging apparatus according to claim 1 wherein:

the first lenticular image element has respective lenticular three-dimensional images each of which includes interleaved lines from a plurality of different perspective views of the same scene taken on a first plane, the second lenticular image element has respective lenticular three-dimensional images each of which includes interleaved lines from a plurality of different perspective views of the same scene as the first lenticular image element, taken on a second plane, wherein the first and second lenticular image elements are oriented so that the virtual integrated lenticular image includes three-dimensional images from the first and second lenticular images which allow the viewer to look around the virtual integrated image in any direction.

7. A method of displaying a virtual lenticular image, comprising the steps of:

projecting the image from each of a first and second lenticular image element each element having a lenticular image of interleaved lines from a plurality of images and a lenticular lens sheet or barrier lens sheet aligned with the lenticular image, onto a beam splitter to form a virtual integrated lenticular image for viewing, said first lenticular image element having a lenticular three-dimensional image which includes interleaved lines from a plurality of different perspective views of the same scene, so that the virtual integrated lenticular image includes a three-dimensional image from the first lenticular image element plus another image from the second lenticular image element.

* * * * *